(12) United States Patent
Ina

(10) Patent No.: US 9,108,593 B2
(45) Date of Patent: Aug. 18, 2015

(54) VEHICLE WIPER DEVICE

(71) Applicant: ASMO CO., LTD., Shizuoka-ken (JP)

(72) Inventor: Eiji Ina, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 272 days.

(21) Appl. No.: 13/791,490

(22) Filed: Mar. 8, 2013

(65) Prior Publication Data

US 2013/0232716 A1    Sep. 12, 2013

(30) Foreign Application Priority Data

Mar. 12, 2012  (JP) ................................. 2012-054804
Mar. 16, 2012  (JP) ................................. 2012-060271
Jan. 25, 2013  (JP) ................................. 2013-012344

(51) Int. Cl.
*B60S 1/06* (2006.01)
*B60S 1/08* (2006.01)
*B60S 1/24* (2006.01)
*B60S 1/28* (2006.01)

(52) U.S. Cl.
CPC ................. *B60S 1/06* (2013.01); *B60S 1/0814* (2013.01); *B60S 1/245* (2013.01); *B60S 1/28* (2013.01)

(58) Field of Classification Search
CPC .............. B60S 1/245; B60S 1/24; B60S 1/18; B60S 1/166
USPC ............... 15/250.27, 250.14, 250.13, 250.16, 15/250.3, 250.31
See application file for complete search history.

(56) References Cited

U.S. PATENT DOCUMENTS

| | | | | |
|---|---|---|---|---|
| 3,942,385 A | * | 3/1976 | Westerdale | 74/70 |
| 5,256,950 A | | 10/1993 | Matsumoto et al. | |
| 5,369,837 A | * | 12/1994 | Chevroulet | 15/250.21 |
| 6,205,612 B1 | * | 3/2001 | Tilli et al. | 15/250.16 |
| 8,234,745 B2 | | 8/2012 | Matsumoto et al. | |
| 2008/0282491 A1 | * | 11/2008 | Matsumoto et al. | 15/250.13 |
| 2009/0007362 A1 | * | 1/2009 | Hasegawa | 15/250.29 |
| 2009/0113654 A1 | * | 5/2009 | Nakamura et al. | 15/250.34 |
| 2010/0162511 A1 | * | 7/2010 | Natsume | 15/250.13 |

FOREIGN PATENT DOCUMENTS

| | | |
|---|---|---|
| JP | 04-197854 A | 7/1992 |
| JP | 11-034805 A | 2/1999 |
| JP | 2008-285078 A | 11/2008 |

* cited by examiner

*Primary Examiner* — Mark Spisich
*Assistant Examiner* — Andrew A Horton
(74) *Attorney, Agent, or Firm* — Christensen Fonder P.A.

(57) ABSTRACT

A vehicle wiper device moves a wiper back and forth between a bottom reversing position and a top reversing position. A drive source rotates an output shaft back and forth about a first axis within a rotational angle range of less than 360°. A link mechanism includes a wiper joint coupled to the wiper. The link mechanism rotates the wiper joint back and forth around a second axis within a rotational angle range that is smaller than the rotational angle range of the output shaft. The link mechanism is configured so that torque of the wiper joint is greater when the wiper is at the bottom reversing position than when the wiper is at the top reversing position.

10 Claims, 6 Drawing Sheets

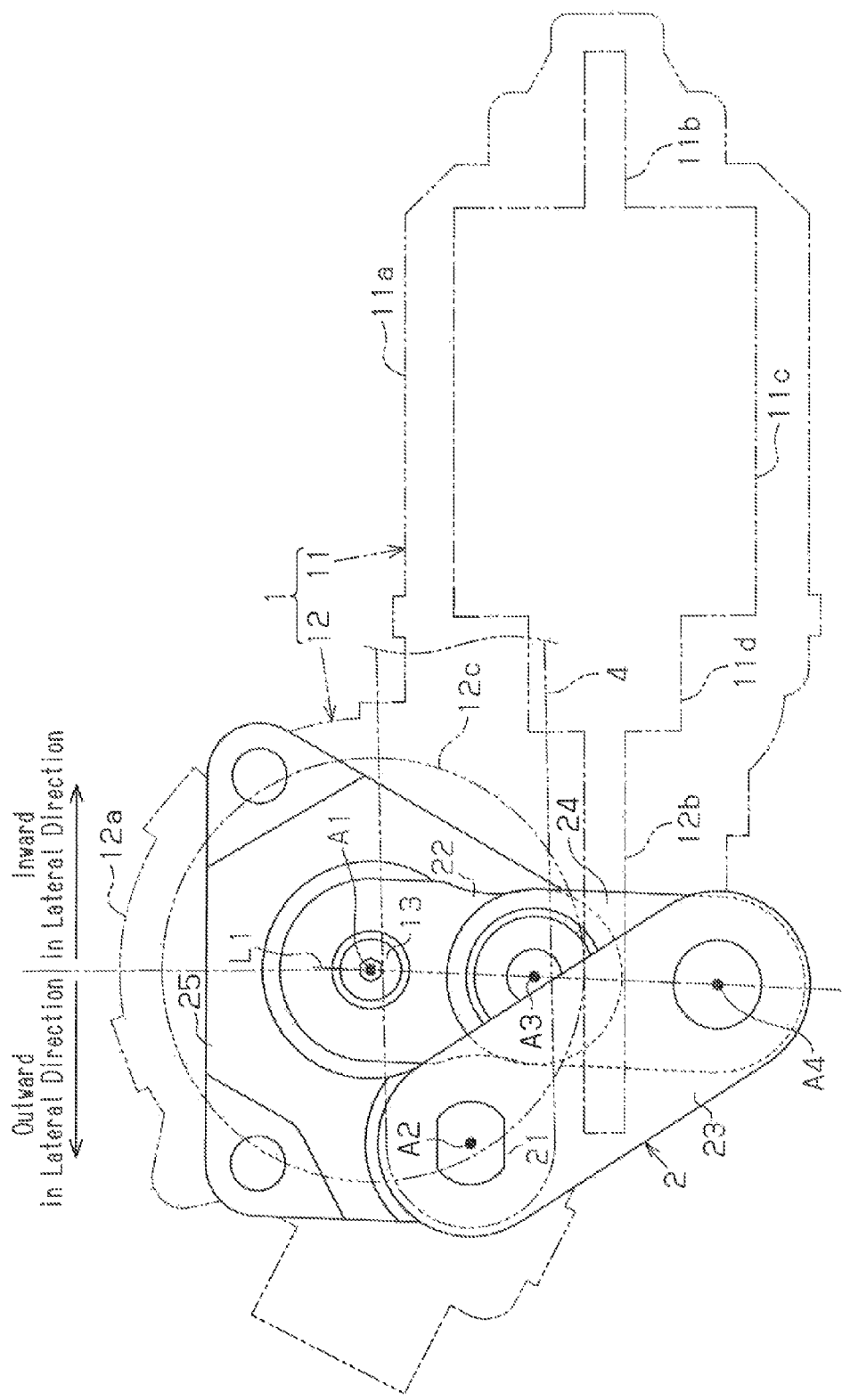

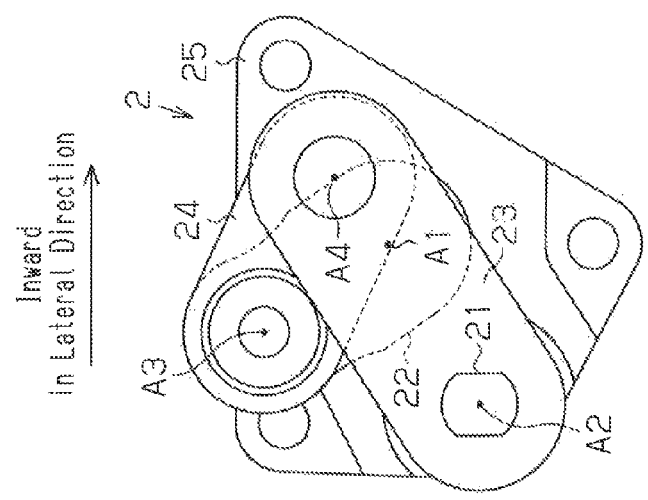
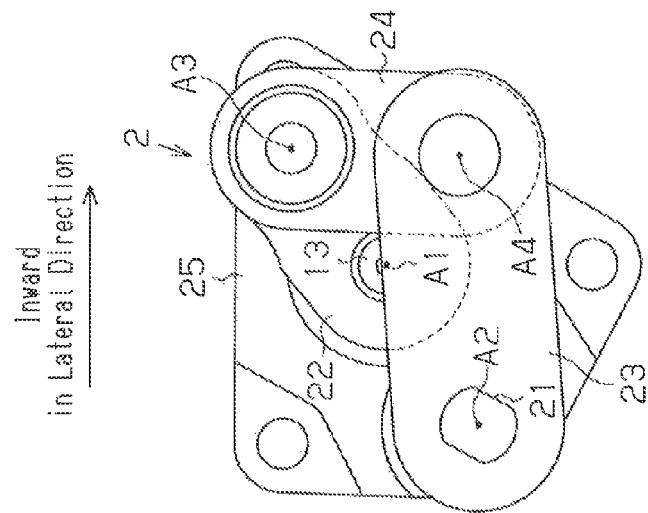
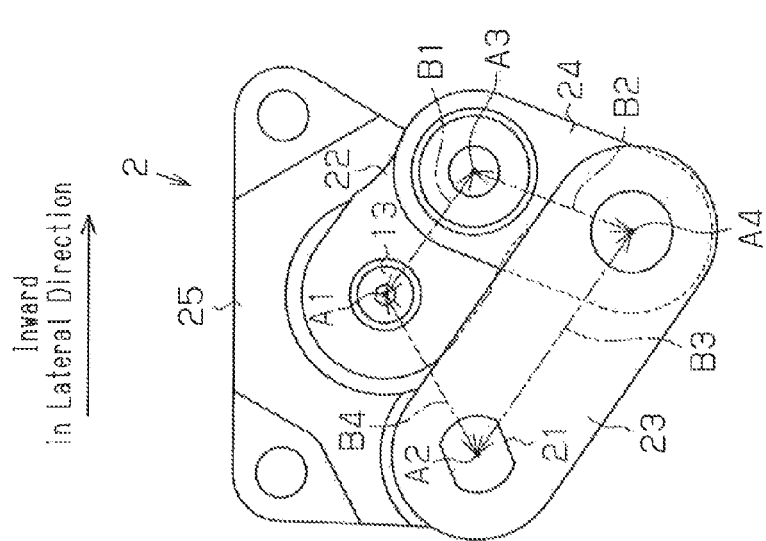

VEHICLE WIPER DEVICE

REFERENCE TO RELATED APPLICATIONS

This application claims priority to Japanese application No. 2012-054804, filed on Mar. 12, 2012, Japanese application No. 2012-060271, filed on Mar. 16, 2012, and Japanese application No. 2013-012344, filed on Jan. 25, 2013.

BACKGROUND ART

The present invention relates to a vehicle wiper device.

Japanese Laid-Open Patent Publication No. 4-197854 describes a vehicle wiper device provided with drivers, each including a drive source and a link mechanism. The drivers are arranged in the vehicle below the two lateral sides of the windshield. Each drive source includes a motor body and a reduction drive. Each link mechanism includes a wiper joint coupled to a wiper. The wipers are arranged to overlap each other in a wiping direction at their bottom reversing positions (stop positions). The above publication discloses a technique that increases the accuracy for controlling the position of a worm wheel in each reduction drive, which forms part of the corresponding drive source, to prevent interference between the driver side wiper and the passenger side wiper.

In the vehicle wiper device, the link mechanism reduces the speed to increase torque of the corresponding wiper when the wiper is performing a wiping operation. This allows for a decrease in the torque generated by the drive source and thus allows for the drive source to be reduced in size. However, the torque of the wiper during a wiping operation differs in accordance with the wiping angle of the wiper. Referring to FIG. 5 that shows curve X1 in broken lines, the link mechanism is usually formed to significantly increase the torque in the proximities of the stop position and a top reversing position in a symmetrical manner relative to the center of the wiping angle. This increases the torque and reduces the speed in the vicinity of the stop position (0°) thereby improving the stop position accuracy, that is, the accuracy of the control for stopping the wiper at the stop position. However, in the vehicle wiper device, the wiper speed lowered in the proximity of the top reversing position (approximately 90°) prolongs the time in which the wiper remains in the proximity of the top reversing position. This blocks the field of view of the vehicle occupant for a longer time.

The drivers of the vehicle wiper device described above are arranged proximal to the lateral ends of the vehicle. Thus, the drivers may interfere with the vehicle body or the like. To prevent such interference, the drivers may be arranged at inwardly locations in the lateral direction of the vehicle. However, when the pivot center of the wiper is located inwardly in the lateral direction of the vehicle, the wiper would be significantly inclined outwardly in the lateral direction relative to the front pillar at the top reversing position. This would form a large non-wiped area.

SUMMARY OF THE INVENTION

A first object of the present invention is to provide a vehicle wiper device that reduces the size of the drive source, improves the control accuracy that stops the wiper at the stop position, and ensures a satisfactory field of view for the vehicle occupant.

A second object of the present invention is to provide a vehicle wiper device that reduces the size of the drive source and obtains a satisfactory wiping area.

To achieve the first object, one aspect of the present invention provides a vehicle wiper device that moves a wiper back and forth between a bottom reversing position and a top reversing position. The vehicle wiper device includes at least one drive source including an output shaft. The drive source rotates the output shaft back and forth about a first axis within a rotational angle range of less than 360°. At least one link mechanism is coupled to the output shaft. The link mechanism includes a wiper joint coupled to the wiper. The link mechanism is configured to rotate the wiper joint back and forth around a second axis within a rotational angle range that is smaller than the rotational angle range of the output shaft. The link mechanism is configured so that torque of the wiper joint is greater when the wiper is at the bottom reversing position than when the wiper is at the top reversing position.

To achieve the second object, one aspect of the present invention is a vehicle wiper device that moves a wiper back and forth on a windshield. The vehicle wiper device includes a drive source fixed to a vehicle and including an output shaft, wherein the drive source rotates the output shaft back and forth about a first axis within a preset rotational angle range. A link mechanism is coupled to the output shaft. The link mechanism includes a wiper joint coupled to the wiper. The wiper joint is rotatable about a second axis that is separated from the first axis of the output shaft. The link mechanism is configured to rotate the wiper joint back and forth in a rotational angle range that is smaller than the rotational angle range of the output shaft. The drive source and the link mechanism form a driver that is arranged in the vehicle below at least one of two ends of the windshield in a lateral direction of the vehicle. The driver is configured so that the second axis of the wiper joint is located outwardly in the lateral direction of the vehicle from the first axis of the output shaft.

BRIEF DESCRIPTION OF THE DRAWINGS

The invention, together with objects and advantages thereof, may best be understood by reference to the following description of the presently preferred embodiments together with the accompanying drawings in which:

FIG. 3 is a plan view showing the link mechanism of FIG. 1;

FIGS. 4A to 4C are plan views showing the operation of the link mechanism of FIG. 1;

DETAILED DESCRIPTION OF THE INVENTION

One embodiment of a vehicle wiper device will now be described with reference to FIGS. 1 to 6.

Figure 1:
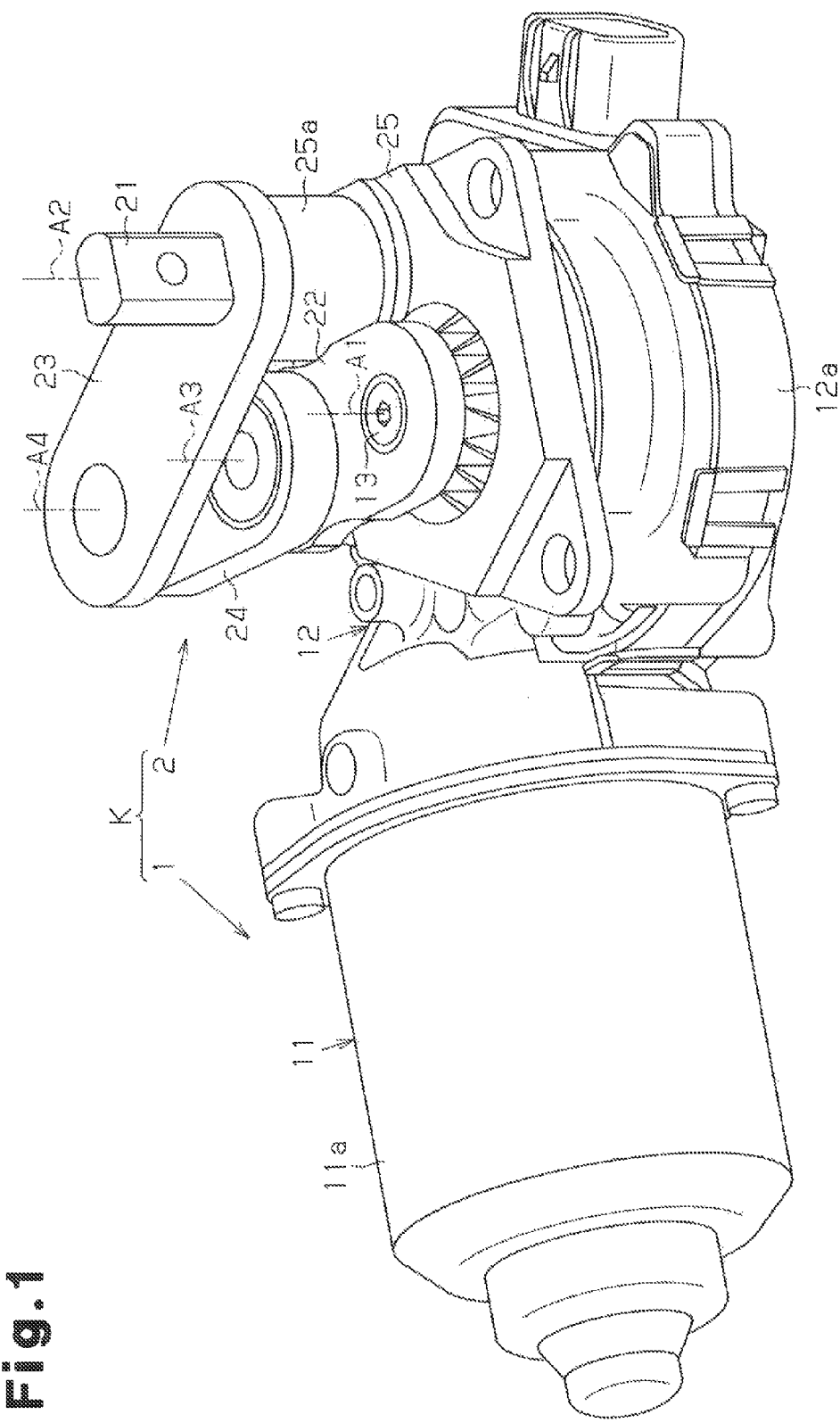
FIG. 1 is a perspective view showing a drive scarce and a link mechanism of a vehicle wiper device according to one embodiment of the present invention.
Figure 2:
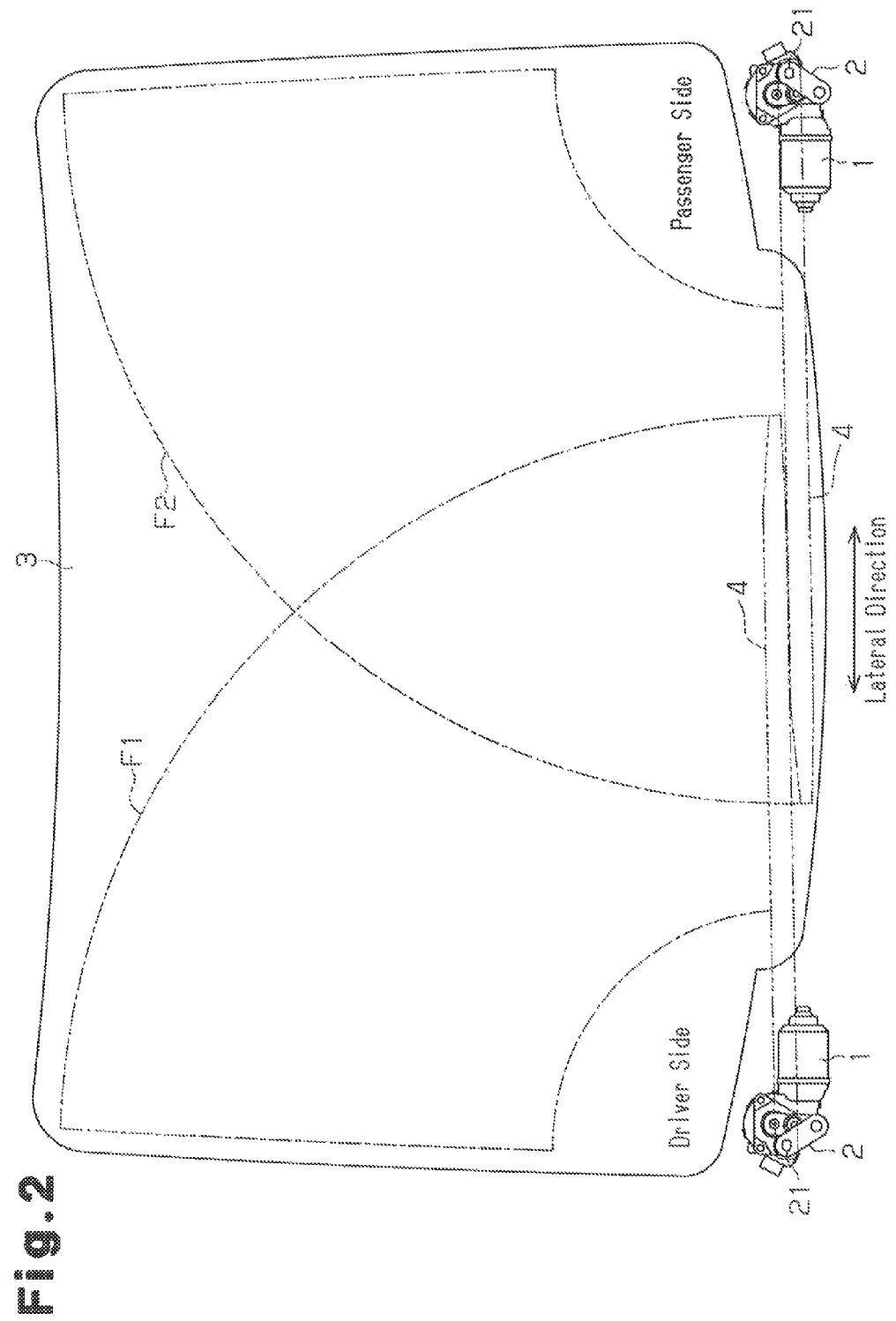
FIG. 2 is a schematic diagram snowing the layout of the wiper device of FIG. 1.

Referring to FIG. 1, the vehicle wiper device includes two drivers K. Each driver K includes a motor 1, which serves as a drive source, and a link mechanism 2. As shown in FIG. 2, the drivers K are arranged at portions of a vehicle below the two lateral ends of a windshield 3, which serves as a wiping surface. A wiper 4 is coupled to each of the two link mechanisms 2. When the wipers 4 are located at a bottom reversing position (lowermost end position or stop position), the wipers 4 are at least partially overlapped with each other in a wiping direction. More specifically, distal portions of the wipers 4 are overlapped with each other in a direction parallel to the wiping surface. In the wiper device of the present embodiment, the driver side (left side as viewed in FIG. 2) wiper 4 and the passenger side (right side as viewed in FIG. 2) are arranged in a symmetrical manner relative to the laterally center point of the windshield 3. Further, the driver side wiper 4 forms a wiping area F1, and the passenger side wiper 4 forms a wiping area F2. The wiping areas F1 and F2 are overlapped with each other at a central part of the windshield 3.

Referring to FIGS. 1 and 3, each motor 1 includes a motor body 11 and a reduction drive 12. As shown in FIG. 3, the motor body 11 includes a yoke 11a, permanent magnets (not shown), a rotation shaft 11b, an armature core 11c, windings (not shown), and a commutator 11d. The yoke 11a is cylindrical and has a closed end. The permanent magnets (not shown) are fixed to the inner surface of the yoke 11a. The rotation shaft 11b is arranged in the yoke 11a and supported to be rotatable relative to the yoke 11a. The windings are wound around the armature core 11c. The motor body 11 rotates and drives the rotation shaft 11b. The reduction drive 12 includes a gear housing 12a, a worm 12b, a worm wheel 12c, and an output shaft 13. The gear housing 12a is fixed to the open end of the yoke 11a. The worm 12b rotates integrally with the rotation shaft 11b in the gear housing 12a. The worm wheel 12c is engaged with the worm 12b. The output shaft 13 projects out of the gear housing 12a and rotates integrally with the worm wheel 12c. The worm 12b and the worm wheel 12c form a worm gear, which reduces the rotation speed of the rotation shaft 11b and rotates the output shaft 13. In this example, the motor 1 includes a sensor (not shown) that detects the rotational angle of the worm wheel 12c. The motor 1 is controlled based on the detection signal from the sensor so that the worm wheel 12c and the output shaft 13 are rotated back and forth within a preset rotational angle range θa that is greater than 180° and less than 360°. In this example, the rotational angle range θa is set to 220°.

Each link mechanism 2 is coupled to the output shaft 13 of the corresponding reduction drive 12 to move the corresponding wiper 4 back and forth between the bottom reversing position and the top reversing position. The bottom reversing position includes a stop position where the wiper 4 pauses. The link mechanism 2 may move the wiper 4 back and forth between the stop position and the top reversing position. The link mechanism 2 is formed to rotate a wiper joint 21, which integrally pivots the coupled wiper 4, back and forth within a rotational angle range (220° in the present embodiment) that is smaller than the rotational angle range θa (90° in the present embodiment) of the output shaft 13. Further, the link mechanism 2 is formed to significantly decrease the moved angle of the wiper joint 21 (i.e., lever 23) in the rotational direction relative to the output shaft 13 (i.e., crank 22). That is, the link mechanism 2 is formed to increase the speed reduction rate. As a result, the torque of the wiper joint 21 when the wiper 4 is located in the proximity of the bottom reversing position is greater than the torque of the wiper joint 21 when the wiper is located in the top reversing position.

In detail, the link mechanism 2 includes the crank 22, the lever 23, and a rod 24. The crank 22 includes a basal end, which is fixed to the output shaft 13, and an opposite distal end. The rod 24 includes a basal end, which is pivotally coupled to the distal end of the crank 22 about an axis A3, and an opposite distal end. The axis A3 serves as a third axis. The lever 23 includes a basal end, which is pivotally coupled to the distal end of the rod 24 about an axis A4, and an opposite distal end, with which the wiper joint 21 is fixed. Specifically, the wiper joint 21 is press-fitted to the distal end of the lever 23 thereby being fixed with the distal end as a single member. The axis A4 serves as a fourth axis. An axis A2 (second axis) of the wiper joint 21 is separated from an axis A1 (first axis) of the output shaft 13. The lever 23 (wiper joint 21) is supported pivotally about the axis A2 by a support sleeve 25a of a bracket 25 (refer to FIG. 1), which is fixed to the gear housing 12a and the vehicle. Thus, the wiper joint 21 is rotatable relative to the support sleeve 25a, and the position of the wiper joint 21 (axis) relative to the support sleeve 25a is fixed. Further, referring to FIG. 3, the axis A2 of the wiper joint 21 is overlapped with the worm wheel 12c of the worm gear in the axial direction. More specifically, as shown in FIG. 1, the link mechanism 2 is arranged on the outer surface of the gear housing 12a. Further, the link mechanism 2 is formed by sequentially stacking the crank 22, the rod 24, and the lever 23 in the direction of the axis A1 in this order on she gear housing 12a (portion of the driver K near the drive source 1) and then coupling together the crank 22, the rod 24, and the lever 23. The support sleeve 25a of the bracket 25 is located at a position overlapped with the worm wheel 12c as viewed from the direction of the axis A1.

FIGS. 1 and 3 shown the wiper 4 located at the bottom reversing position (lowermost position). Referring to FIG. 3, the link mechanism 2 is set so that the axis A1 of the output shaft 13, the axis A3, and the axis A4 are arranged along a straight line L1 as viewed from the axial direction when the wiper 4 is located at the bottom reversing position (lowermost position).

Figure 5:
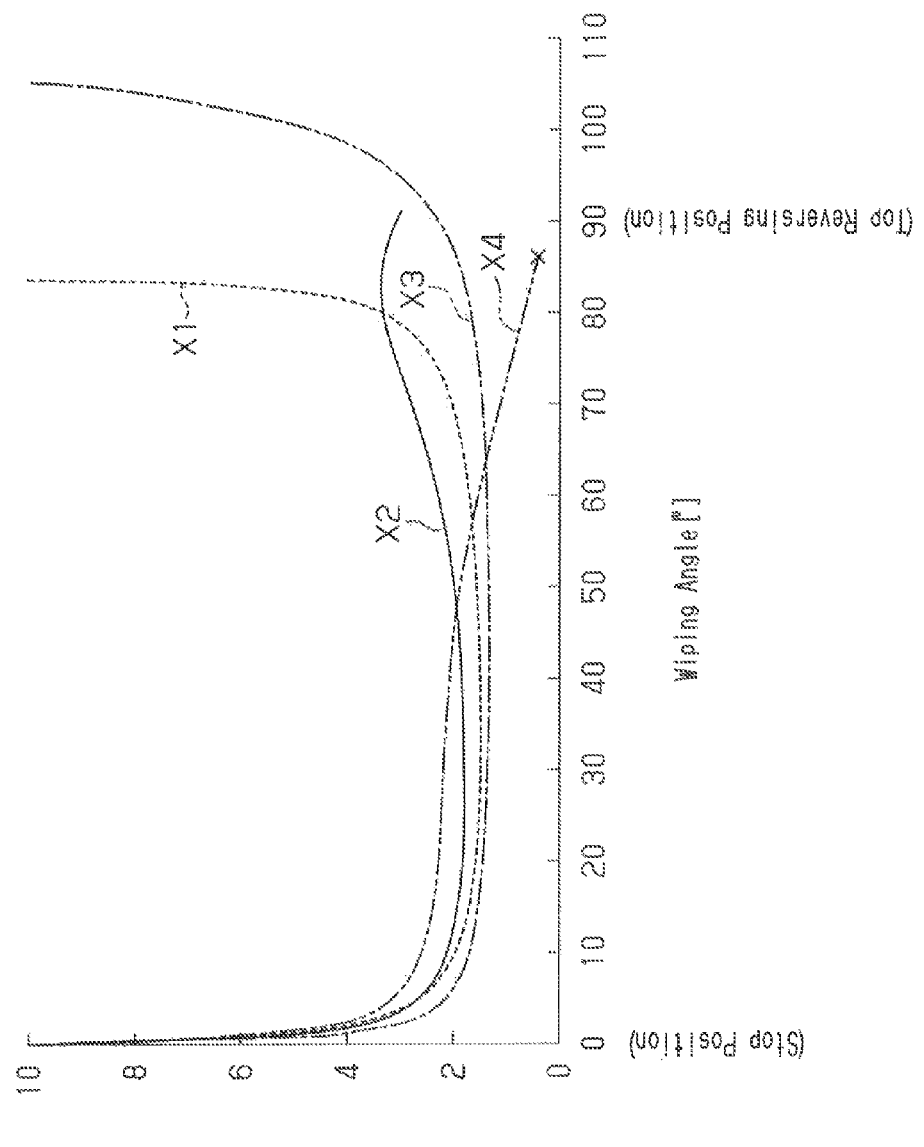
FIG. 5 is a graph snowing the relationship of the wiping angle and the torque amplification ratio in the link mechanism of FIG. 1.

Further, the link mechanism 2 is formed so that the relationship between the wiping angle and the torque amplification ratio conforms to curve X2, which is shown in FIG. 5. The torque amplification rate indicates the torque of the wiper joint 21 when the torque of the output shaft 13 is set as "1". The link mechanism 2 is formed so that the torque of the wiper joint 21 when the wiper 4 is located at the bottom reversing position (0°) is two times or greater than the torque of the wiper joint 21 when the wiper 4 is located at the top reversing position (90°). In the present embodiment, the torque of the wiper joint 21 when the wiper 4 is located at the bottom reversing position (0°) is approximately three times greater than the torque of the wiper joint 21 when the wiper 4 is located at the top reversing position (90°). In other words, the torque of the wiper joint 21 when the wiper 4 is located at the top reversing position (90°) is one half or less, in the present embodiment, approximately, one third, of the torque of the wiper joint 21 when the wiper 4 is located at the bottom reversing position (0°). Further, the link mechanism 2 is formed so that when the wiper 4 is pivoted from the bottom reversing position (0°), the torque of the wiper joint 21 becomes close to minimum before the wiper 4 is pivoted by approximately 10°. Then, the torque of the wiper joint 21 remains generally constant near the minimum value until the wiper 4 is pivoted to the point that is approximately 50°. Subsequently, the torque of the wiper joint 21 gradually increases until the wiper 4 is pivoted to the point that is approximately 80°. Afterward, the torque of the wiper joint 21 gradually decreases until the wiper 4 is pivoted to the top reversing position (90°). The torque of the wiper joint 21 when the wiper 4 is in the proximity of the top reversing position is greater than the minimum torque of the wiper joint 21 in the wiping angle range of the wiper 4. The torque becomes minimal when the wiper joint 21 is in the range of approximately 10° to approximately 50°. In FIG. 5, curve X1, which is shown by broken lines, indicates the relationship between the wiping angle and the torque amplification ratio in a typical link mechanism. Curve X1 is symmetrical relative to the center of the wiping angle, and the torque significantly increases in the proximities of the two lateral ends.

Referring to FIG. 4A, the length B1 between the axes A1 and A3, the length B2 between the axes A3 and A4, the length B3 between the axes A4 and A2, the length B4 between the axes A2 and A1, and the positional relationship of the axis A1 of the output shaft 13 and the axis A2 of the wiper joint 21 are adjusted so that the link mechanism 2 obtains the properties described above. For example, in the present embodiment, the lengths of the crank 22, the lever 23, and the rod 24 are set so that the length B2 from the axis A3 to the axis A4 is greater than the length B1 from the axis A1 of the output shaft 13 to the axis A3, and so that the length B3 from the axis A4 to the axis A2 of the wiper joint 21 is greater than the length B2 from the axis A3 to the axis A4.

In the present embodiment, the length B4 from the axis A2 of the wiper joint 21 to the axis A1 of the output shaft 13 is greater than the length B2 from the axis A3 to the axis A4 and less than the length B3 from the axis A4 to the wiper joint 21.

Figure 6:
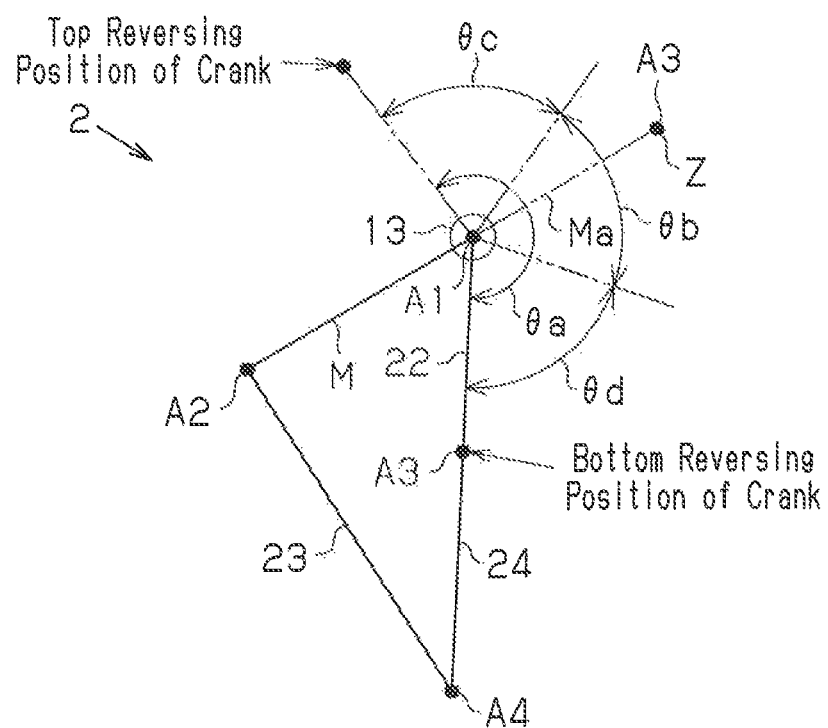
FIG. 6 is a schematic diagram showing the operation of the link mechanism of FIG. 1.

Referring to FIG. 6, the pivoting direction of the rod 24 about the axis A4 switches when the crank 22 reaches an intermediate reversing position Z, which is located between bottom and top reversing positions of the crank 22. The bottom reversing position of the crank 22 is the position of the crank 22 when the wiper 4 is located at the lower reversing position. The top reversing position of the crank 22 is the position of the crank 22 when the wiper 4 is located at the top reversing position. When the crank 22 is located at the intermediate reversing position Z, the axis A2 of the wiper joint 21, the axis A1 of the output shaft 13, and the axis A3 are arranged along a straight line Ma. The rotational angle range θa (in this example, 220°) of the output shaft 13 and the crank 22 is evenly divided into three, and the obtained middle range is defined as the middle angle range θb. The location of the axis A2 of the wiper joint 21 relative to the joint A1 of the output shaft 13 is adjusted so that the intermediate reversing position Z is located in the middle angle range θb. In the present embodiment, the intermediate reversing position Z is set at a location closer to the center of the middle angle range θb than the end of the middle angle range θb. Further, as shown in FIG. 6, in the present embodiment, when the crank 22 is located at the bottom reversing position, the axis A2 of the wiper joint 21 is located on a line perpendicular to a line segment connecting the axis A1 of the output shaft 13 and the axis A3. Further, when the crank 22 is located at the bottom reversing position, the axis A2 of the wiper joint 21 is set to be in the side of the line segment opposite to the side toward which the crank 22 is pivoted.

As shown in FIGS. 2 and 3, the driver K (motor 1 and link mechanism 2) of the present embodiment is formed so that the axis A2 of the wiper joint 21 is arranged outwardly in the lateral direction of the vehicle from the axis A1 of the output shaft 13. Further, the link mechanism 2 is formed so that when installed in the vehicle, the axis A3 and the axis A4 are arranged inwardly in the lateral direction of the vehicle from the axis A2 of the wiper joint 21 (refer to FIGS. 4A to 4C). Further, the driver K is formed so that when installed in the vehicle, the motor body 11 is arranged inwardly in the lateral direction of the vehicle from the axis A1 of the output shaft 13. In other words, the driver K is formed so that the yoke 11a of the motor body 11 extends inwardly in the lateral direction of the vehicle.

The operation of the vehicle wiper device will now be described.

When, for example, an operation switch arranged near the driver seat is operated thereby driving the motor 1, the output shaft 13 is rotated back and forth in the rotational angle range of 220°. The rotation of the output shaft 13 pivots the crank 22 back and forth. Power is transmitted from the crank 22 via the rod 24 to the lever 23. This shifts the link mechanism 2 from the bottom reversing position, which is shown in FIG. 3, via the position shown in FIG. 4A and the position shown in FIG. 4B to the top reversing position shown in FIG. 4C. Then, the link mechanism 2 shifts to the position shown in FIG. 4B, the position shown in FIG. 4A, and the bottom reversing position shown in FIG. 3. The link mechanism 2 repeatedly performs this operation. Referring to FIGS. 3 and 4A to 4C, the axis A3 and the axis A4 do not move outwardly in the lateral direction of the vehicle from the axis A2 of the wiper joint 21 regardless of the rotational angle of the wiper joint 21. This pivots the wiper 4 (refer to FIG. 2) with the wiper joint 21 back and forth in the pivotal angle range of 90°. Here, due to the structure of the link mechanism 2, when the wiper 4 is located at the bottom reversing position (when the link mechanism 2 is in the position shown in FIG. 3), the rotational angle of the wiper joint 21 (i.e., pivotal angle of the lever 23) is extremely small relative to the rotational angle of the output shaft 13 (i.e., pivotal angle of the crank 22). Thus, the speed reduction rate of the link mechanism 2 is large when the wiper 4 is located at the intermediate position. When the wiper 4 is located at an intermediate position (when the link mechanism 2 is in the position shown in FIG. 4A), the rotational angle of the output shaft 13 is substantially the same as the rotational angle of the wiper joint 21. The speed reduction rate when the wiper 4 is located at an intermediate position is determined in accordance with the length of the crank 22 and the length of the lever 23. As the wiper 4 moves from the intermediate position to the top reversing position, in which the link mechanism 2 is in the position shown in FIG. 4C, the rotational angle of the wiper joint 21 gradually decreases relative to the rotational angle of the output shaft 13. That is, the link mechanism 2 increases the speed reduction rate as the wiper moves from the intermediate position to the top reversing position. The speed reduction rate of the link mechanism 2 when the wiper 4 is at the top reversing position is smaller than the speed reduction rate when the wiper is located at the bottom reversing position. Further, the rotation direction of the rod 24 about the axis A4 is reversed at the intermediate reversing position Z.

The present embodiment has the advantages described below.

(1) The link mechanism 2 arranged between the output shaft 13 and the wiper 4 rotates the output shaft 13 by 220° and pivots the wiper 4 back and forth by 90°. This increases the torque of the wiper device compared to, for example, a link mechanism that rotates the output shaft 13 once to pivotally reciprocate the wiper 4 once, that is, a link mechanism that rotates the output shaft by 180° to pivot the wiper 4 by 90°. This decreases the torque generated by the motor 1 to pivot the wiper 4, and allows for the motor 1 to be reduced in size.

Further, the link mechanism 2 is formed so that during a wiping operation, the torque of the wiper joint 21 when the wiper is in the proximity of the bottom reversing position is greater than the torque of the wiper joint 21 when the wiper 4 is in the proximity of the top reversing position. Thus, when the wiper 4 is located in the proximity of bottom reversing position, the pivotal angle of the wiper 4 is further decreased relative to the rotation angle of the output shaft 13. That is, the pivoting speed of the wiper 4 relative to the rotation speed of the output shaft 13 is decreased, and the accuracy of the control for stopping the wiper 4 at the bottom reversing position is improved. Further, the torque applied to the wiper 4 is large. Thus, for example, when a rubber blade of the wiper is frozen and fixed to the windshield 3 (wiping surface) at the bottom reversing position, the wiper 4 can be pulled off the windshield 3, and the wiping operation of the wiper 4 can easily be started.

Moreover, during a wiping operation, the torque of the wiper joint 21 when the wiper 4 is located in the proximity of the top reversing position is smaller than the torque of the wiper joint 21 when the wiper 4 is located in the proximity of the bottom reversing position. Thus, the speed of the wiper 4 does not significantly decrease in the vicinity of the top reversing position. This allows the time during which the field of view is blocked to be shortened compared to a link mechanism having a symmetrical torque curve relative to the center of the wiping angle (refer to curve X1 shown by the broken lines in FIG. 5). Thus, the motor 1 may be reduced in size, the accuracy of the control for stopping the wiper 4 at the stop position (bottom reversing position) can be improved, and a satisfactory field of view can be ensured.

Further, during a wiping operation, the link mechanism 2 gradually decreases the rotation angle of the wiper joint 21 relative to the rotation angle of the output shaft 13 as the wiper 4 moves from an intermediate position, which is shown in FIG. 4A, toward the top reversing position, which is shown in FIG. 4C. That is, the link mechanism 2 is formed to increase the speed reduction rate as the wiper 4 moves from an intermediate position to the top reversing position. This further prevents overrunning of the wiper 4 from the top reversing position.

(2) The link mechanism 2 is formed so that the axis A1 of the output shaft 13, the axis A3 (the pivot center of the crank 22 and the rod 24), and the axis A4 (pivot center of the rod 24 and the lever 23) are arranged along the same straight line L1 as viewed from the axial direction (refer to FIG. 3) when the wiper 4 is located at the bottom reversing position. Thus, when starting and stopping the wiper 4, that is, when the wiper 4 is located in the proximity of the bottom reversing position, the speed of the wiper joint 21 becomes lowest and the torque of the wiper joint 21 becomes highest. Thus, for example, when stopping the wiper 4 at the stop position, the accuracy for controlling the stopping may be further improved.

(3) The intermediate reversing position Z where the rotation direction of the rod 24 about the axis A4 is reversed is located in the middle angle range θb, which is the middle range when dividing the pivotal angle range θa of the output shaft 13 and the crank 22 into three. The formation of the link mechanism 2 in such a manner allows for the torque of the wiper joint 21 when the wiper 4 is in the proximity of the top reversing position to be greater than the minimum torque in the operational range, that is, the torque of the wiper joint 21 when the wiper 4 is located at the intermediate position (refer to curve X2 in FIG. 5). This reduces overrunning of the wiper 4 from the top reversing position. When the position of the axis A2 of the wiper joint 21 relative to the axis A1 of the output shaft 13 is set so that the intermediate reversing position Z is in a range θc, which is located closer to the top reversing position than the middle angle range θb, the amplification of the torque becomes subtle in the proximity of the top reversing position (refer to curve X3 shown by single-dashed line in FIG. 5). Further, when the position of the axis A2 of the wiper joint 21 relative to the axis A1 of the output shaft 13 is set so that the intermediate reversing position Z is in a range θd, which is located closer to the bottom reversing position than the middle angle range θb, the torque decreases as the wiper 4 approaches the top reversing position, and the pivoting of the wiper 4 to the top reversing position becomes mechanically difficult (refer to curve X4 shown by double-dashed line in FIG. 5). In FIG. 5, the cross marked on curve X4 indicates that the wiper 4 cannot be mechanically pivoted.

(4) The bracket 25 is fixed to the gear housing 12a (drive source 1) and the vehicle. The bracket 25 includes a support sleeve 25a that supports the wiper joint 21 so that the wiper joint 21 is rotatable about the axis A2. Further, the link mechanism 2 is formed by sequentially stacking the crank 22, the rod 24, and the lever 23 on the gear housing 12a (drive source 1) in this order in the axial direction of the output shaft 13 and then coupling together the crank 22, the rod 24, and the lever 23. This forms the link mechanism 2 in a satisfactory manner.

(5) The link mechanism 2 is formed so that the axis A2 of the wiper joint 21 is overlapped with the worm wheel 12c of the worm gear as viewed from the direction of the axis A1 in the output shaft 13. This reduces the area of the wiper joint 21 (link mechanism 2) in the axial direction in comparison with a wiper device formed so that the axis A2 of the wiper joint 21 does not overlap with the worm gear and allows for reduction in the size of the wiper device. Further, this allows for the driver K to be easily accommodated in the vehicle.

(6) The motor 1 and the link mechanism 2 are arranged in the vehicle below each of the two lateral ends of the windshield 3. The wipers 4 coupled to the link mechanisms 2 are arranged to overlap each other in the wiping direction at their stop positions. This improves the accuracy for controlling the wipers 4 to stop at the stop positions. Consequently, the wipers 4 do not interfere with each other, and satisfactory wiping areas F1 and F2 are obtained at the two lateral sides of the windshield 3.

(7) The link mechanism 2 is formed so that during a wiping operation, the torque of the wiper joint 21 when the wiper 4 is at the stop position is two times greater than the torque of the wiper joint 21 when the wiper 4 is at the top reversing position. This produces a large difference in torque and a large difference in the speed of the wiper 4. Thus, the accuracy of the control for stopping the wiper 4 at the stop position can be improved, and a satisfactory field of view is further ensured.

(8) The drivers K (motor 1 and link mechanism 2) are arranged in the vehicle below the two lateral ends of the windshield 3. Each driver K is formed so that the axis A2 of the wiper joint 21 is arranged outwardly in the lateral direction of the vehicle from the axis A1 of the output shaft 13. This allows the pivot center of the wiper 4 to be located outwardly as much as possible in the lateral direction of the vehicle, while accommodating the driver K in the vehicle. Thus, when the wiper 4 is located at the top reversing position in the wiping area F1 or F2, the wiper 4 may be arranged generally along the front pillar, which serves as the vertical portion of the frame for the windshield 3. This reduces the non-wiped area of the wiper 4 and allows for the formation of a large wiping area. Accordingly, a satisfactory wiping area may be obtained.

(9) The driver K is formed so that the motor body 11 is arranged inwardly in the lateral direction of the vehicle from the axis A1 of the output shaft 13. Thus, the pivot center of the wiper 4 may be arranged further outwardly in the lateral direction of the vehicle without being interference from the motor body 11. This further reduces the non-wiped area, and allows for the formation of a larger wiping area.

(10) The link mechanism 2 is formed so that the axis A3 (pivot center of the crank 22 and the rod 24) and the axis A4 (pivot center of the rod 24 and the lever 23) are arranged inwardly in the lateral direction of the vehicle from the axis A2 of the wiper joint 21 regardless of the pivot angle of the wiper joint 21. Thus, most of the link mechanism 2 may easily be accommodated in a space located inwardly in the lateral direction of the vehicle from the axis A2 of the wiper joint 21.

Further, the pivot center of the wiper 4 may be arranged outwardly as much as possible in the lateral direction of the vehicle.

The above embodiment may be modified as described below.

In the above embodiment, the link mechanism 2 is formed so that when the wiper 4 is at the stop position, the axis A1 of the output shaft 13, the axis A3, and the axis A4 are arranged along the same straight line L1 as viewed from the axial direction (refer to FIG. 3). However, a link mechanism may be formed so that when the wiper 4 is at the stop position, the axis A1, the axis A3, and the axis A4 are not arranged along the same straight line L1.

The lengths B1 to B4 between the axes (i.e., A1 and A3, A3 and A4, A4 and A2, and A2 and A1) may be changed. For example, in the above embodiment, the length B4 from the axis A2 of the wiper joint 21 to the axis A1 of the output shaft 13 is set to be greater than the length B2 from the axis A3 to the axis A4. Instead, the length B4 may be set to be less than the length B2, while maintaining the longitudinal relationship of other locations.

In the above embodiment, the link mechanism 2 is arranged so that the axis A2 of the wiper joint 21 overlaps with the output shaft 13 of the worm wheel 12c in the axial direction of the output shaft 13. However, the link mechanism 2 may be formed so that the axis A2 of the wiper joint 21 does not overlap with the worm gear.

In the above embodiment, the motor 1 and the link mechanism 2 are arranged in the vehicle below each of the two lateral ends of the windshield 3, and the wipers 4 overlap each other in the wiping direction at the stop position. However, the vehicle wiper device may be formed so that the two wipers 4 do not overlap each other in the wiping direction.

In the above embodiment, the link mechanism 2 is formed so that the torque of the wiper joint 21 when the wiper 4 is at the stop position during a wiping operation is two times or greater, specifically, approximately three times, the torque of the wiper joint 21 when the wiper 4 is at the top reversing position. However, the link mechanism 2 only needs to be formed so that the torque of the wiper joint 21 when the wiper 4 is at the stop position is greater than the torque of the wiper joint 21 when the wiper 4 is at the stop position. For example, the link mechanism 2 may be set so that the torque of the wiper joint 21 at the stop position is set to be 2.5 times or 1.5 times greater than the torque of the wiper joint 21 at the top reversing position. Further, in the above embodiment, the link mechanism 2 is set so that the torque of the wiper joint 21 slightly decreases (refer to curve X2 in FIG. 5) from when the wiper 4 is pivoted to an approximately 80° point to when the wiper 4 reaches the top reversing position (90°). Instead, the torque may gradually be increased until the wiper 4 reaches the top reversing position (90°). In this case, the setting of the link mechanism 2 is performed by adjusting the lengths B1 to B4 between the axes (i.e., A1 and A3, A3 and A4, A4 and A2, and A2 and A1) and the positional relationship of the axis A2 of the wiper joint 21 relative to the axis A1 of the output shaft 13, while taking into consideration the rotational angle of the wiper joint 21 relative to the rotational angle of the output shaft 13 (crank 22).

In the above embodiment, the vehicle wiper device includes the drive source that rotates the output shaft 13 (worm wheel 12c) back and forth within a rotational angle range of 220°. The link mechanism may be formed so that the torque of the wiper joint 21, when the wiper 4 is located at the stop position, is greater than the torque of the wiper joint 21 when the wiper 4 is located in the proximity of the top reversing position. For example, a vehicle wiper device may include a drive scarce that rotates the output shaft 13 back and forth within a different rotational angle range of less than 360°, which is greater than the pivotal angle range of the wiper 4 (rotational angle range of the wiper joint 21). Further, there is no need for a vehicle wiper device to rotate the output shaft 13 back and forth within a rotational angle range that is greater than 180°. That is, a vehicle wiper device may rotate the output shaft 13 back and forth within a rotational angle range that is less than or equal to 180°. In the above embodiment, the vehicle wiper device pivots the wiper 4 (wiper joint 21) back and forth within a pivotal angle range of 90°. However, the vehicle wiper device may pivot the wiper 4 (wiper joint 21) back and forth within a pivotal angle range that is not 90° (greater than 90°, for example 110°).

In the above embodiment, the driver K is formed so that the motor body 11 is entirely arranged inwardly in the lateral direction of the vehicle from the output shaft 13. Instead, the motor 1 may partially be arranged outwardly in the lateral direction of the vehicle from the axis A1 of the output shaft 13. In this case, the motor body 11 (yoke 11a) is preferably arranged inwardly in the lateral direction of the vehicle from the axis A2 of the wiper joint 21. In this case, the motor body 11 (yoke 11a) does not project outwardly in the lateral direction of the vehicle from the axis A2 of the wiper joint 21. Thus, the pivot center of the wiper 4 may be arranged outwardly as much as possible in the lateral direction of the vehicle from the axis A2 of the wiper joint 21.

In the above embodiment, the axis A3 and the axis A4 of the link mechanism 2 is arranged inwardly in the lateral direction of the vehicle from the axis A2 of the wiper joint 21 regardless of the rotational angle of the wiper joint 21. Instead, the axis A3 and the axis A4 (i.e., a portion of the rod 24) may be arranged outwardly in the lateral direction of the vehicle from the axis A2 of the wiper joint 21.

In the above embodiment, the link mechanism 2 is formed so that, during a wiping operation, the torque of the wiper joint 21 when the wiper 4 is located in the proximity of the stop position is greater than the torque of the wiper joint 21 when the wiper 4 is located in the proximity of the top reversing position. Instead, for example, a wiper device may include a link mechanism that obtains a torque curve that is symmetrical relative to the center of the wiping angle.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A vehicle wiper device that moves a wiper back and forth between a bottom reversing position and a top reversing position, the vehicle wiper device comprises:
    at least one drive source including an output shaft, wherein the drive source rotates the output shaft back and forth about a first axis within a rotational angle range of less than 360°; and
    at least one link mechanism coupled to the output shaft, wherein the link mechanism includes a wiper joint coupled to the wiper, the link mechanism is configured to rotate the wiper joint back and forth around a second axis within a rotational angle range that is smaller than the rotational angle range of the output shaft, and the link mechanism is configured so that torque of the wiper joint is greater when the wiper is at the bottom reversing position than when the wiper is at the top reversing position wherein the link mechanism includes:

a crank including a basal end, which is fixed to the output shaft, and an opposite distal end;

a rod including a basal end, which is coupled to the distal end of the crank rotatably about a third axis, and an opposite distal end; and a lever including a basal end, coupled to the distal end of the rod rotatably about a fourth axis, and an opposite distal end, with which the wiper joint is fixed, wherein the second axis of the wiper joint is separated from the first axis of the output shaft, the link mechanism is configured so that the first axis, the third axis, and the fourth axis are arranged along a straight line as viewed in axial directions of the first, third, and fourth axes when the wiper is at the bottom reversing position, and the rod pivots about the fourth axis in a pivotal direction and the pivotal direction is reversed when the crank reaches an intermediate reversing position located between a position of the crank when the wiper is located at the bottom reversing position and a position of the crank when the wiper is located at the top reversing position.

2. The vehicle wiper device according to claim 1, wherein the second axis, the first axis, and the third axis are arranged along a straight line when the crank is at the intermediate reversing position.

3. The vehicle wiper device according to claim 2, wherein when a rotational angle range of the crank and the output shaft is divided into three angle ranges, the intermediate reversing position is located in a middle one of the three angle ranges.

4. The vehicle wiper device according to claim 1, further comprising:

a bracket fixed to the drive source and a vehicle, wherein the bracket includes a support sleeve that supports the wiper joint so that the wiper joint is rotatable about the second axis, and wherein the link mechanism is configured by sequentially stacking the crank, the rod, and the lever in this order on the drive source and coupling together the crank, the rod, and the lever.

5. The vehicle wiper device according to claim 1, wherein the drive source includes a motor body and a worm gear, and the link mechanism is configured so that the second axis of the wiper joint is overlapped with the worm gear as viewed from an axial direction of the output shaft.

6. The vehicle wiper device according to claim 1, wherein the link mechanism is configured so that a torque of the wiper joint when the wiper is at the bottom reversing position is two times or greater than a torque of the wiper joint when the wiper is at the top reversing position.

7. The vehicle wiper device according to claim 1, wherein the drive source and the link mechanism forms a driver coupled to the wiper, the driver is one of a plurality of drivers respectively arranged proximal to two ends of a windshield in a lateral direction of a vehicle, and wipers respectively coupled to the drivers are overlapped with each other in a wiping direction at the bottom reversing position.

8. The vehicle wiper device according to claim 1, wherein the wiper is moved back and forth on a windshield, the drive source is fixed to a vehicle, the drive source and the link mechanism form a driver that is arranged in the vehicle below at least one of two ends of the windshield in a lateral direction of the vehicle, and the driver is configured so that the second axis of the wiper joint is located outwardly in the lateral direction of the vehicle from the first axis of the output shaft.

9. The vehicle wiper device according to claim 8, wherein the drive source includes a motor body and a worm gear, the motor body includes a rotation shaft rotated and driven by the motor body, the worm gear rotates the output shaft to reduce the rotation speed of the rotation shaft, and the driver is configured so that the motor body is arranged at a position located inwardly in the lateral direction of the vehicle from the first axis.

10. The vehicle wiper according to claim 8, wherein the link mechanism is configured so that the third axis, and the fourth axis are arranged inwardly in the lateral direction of the vehicle from the second axis regardless of the rotational angle of the wiper joint.

* * * * *